United States Patent [19]
Duke

[11] Patent Number: 5,261,520
[45] Date of Patent: Nov. 16, 1993

[54] CUSTODIAL BOOK TRANSFER SYSTEM

[75] Inventor: B. Michael Duke, Clayton, Ohio

[73] Assignee: AM International, Inc., Chicago, Ill.

[21] Appl. No.: 971,891

[22] Filed: Nov. 4, 1992

[51] Int. Cl.⁵ .............................................. B65G 47/24
[52] U.S. Cl. .................................... 198/375; 198/377;
198/465.4; 198/687.1; 198/462
[58] Field of Search ............ 198/375, 377, 378, 465.1,
198/465.2, 465.3, 680, 687.1, 803.01, 803.2, 461,
462; 271/185

[56] References Cited

U.S. PATENT DOCUMENTS

| | | | |
|---|---|---|---|
| 2,779,453 | 1/1957 | Lippert et al. | 198/377 |
| 2,789,683 | 4/1957 | Stahl | 198/465.2 |
| 3,189,158 | 6/1965 | Lucas | 198/377 |
| 3,204,756 | 9/1965 | Lesch | 198/465.1 |
| 3,722,710 | 3/1973 | Ixer et al. | 198/377 |
| 3,747,737 | 7/1973 | Brooke | 198/377 |
| 4,007,824 | 2/1977 | Reist | 198/465.4 |
| 4,201,286 | 5/1980 | Meier | 198/465.4 |
| 4,330,288 | 5/1982 | Russell et al. | 198/377 |
| 4,586,598 | 5/1986 | Ehlscheid et al. | 198/377 |
| 4,724,944 | 2/1988 | Koshigai et al. | 198/680 |

Primary Examiner—Joseph E. Valenza

[57] ABSTRACT

An apparatus for transferring a plurality of books from a binder conveyor to another conveyor. The apparatus includes a plurality of grippers for receiving the books from the binder conveyor and gripping the books. The apparatus includes a conveyor for moving the grippers at a first interval and a first orientation. The apparatus includes a device for rotating the grippers from the first orientation to a second orientation. The apparatus includes a device for changing the relative displacement of the grippers from the first interval to a second interval, different from the first interval. The apparatus includes a conveyor for moving the grippers at the second interval and the second orientation.

20 Claims, 10 Drawing Sheets

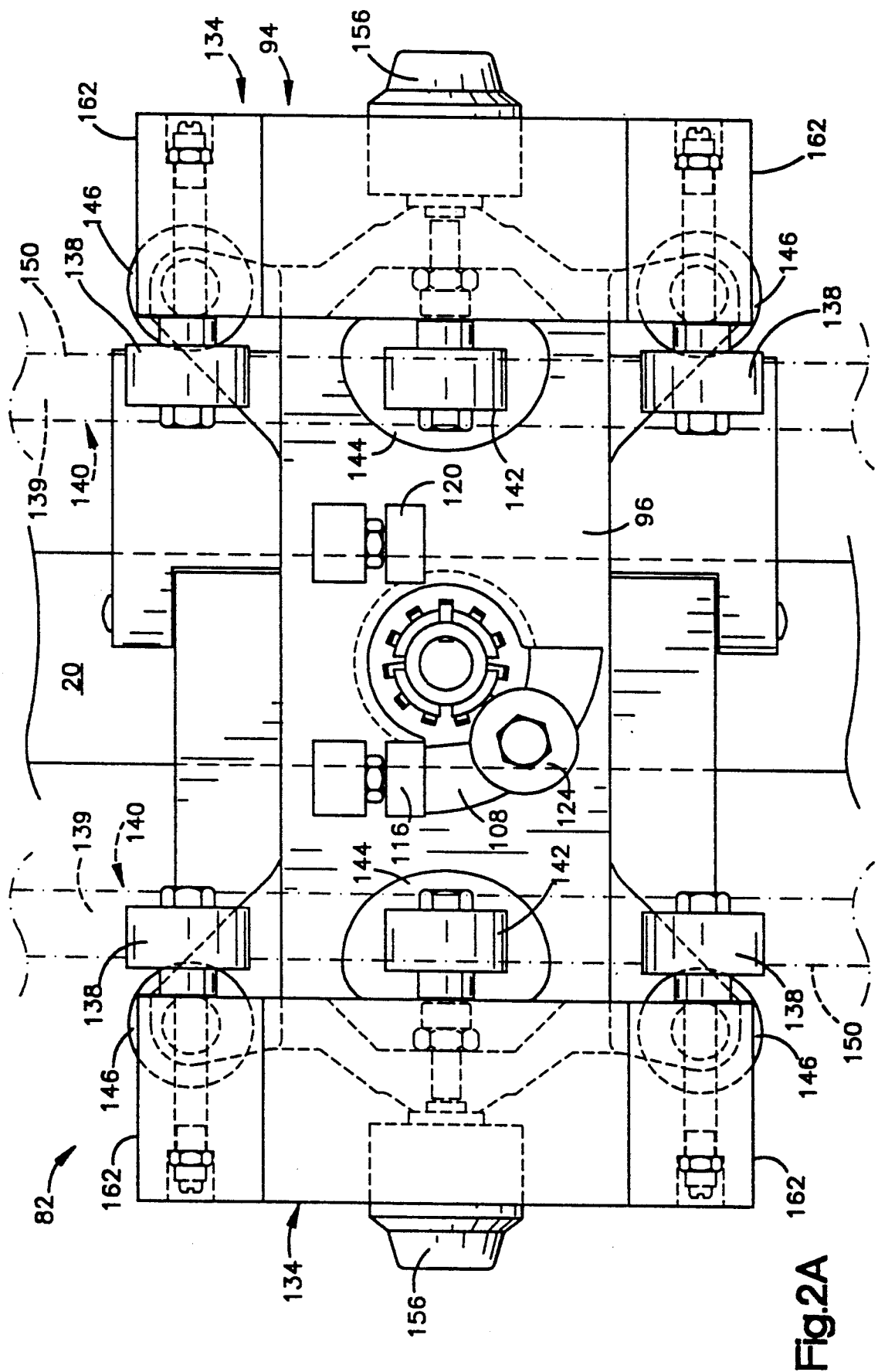

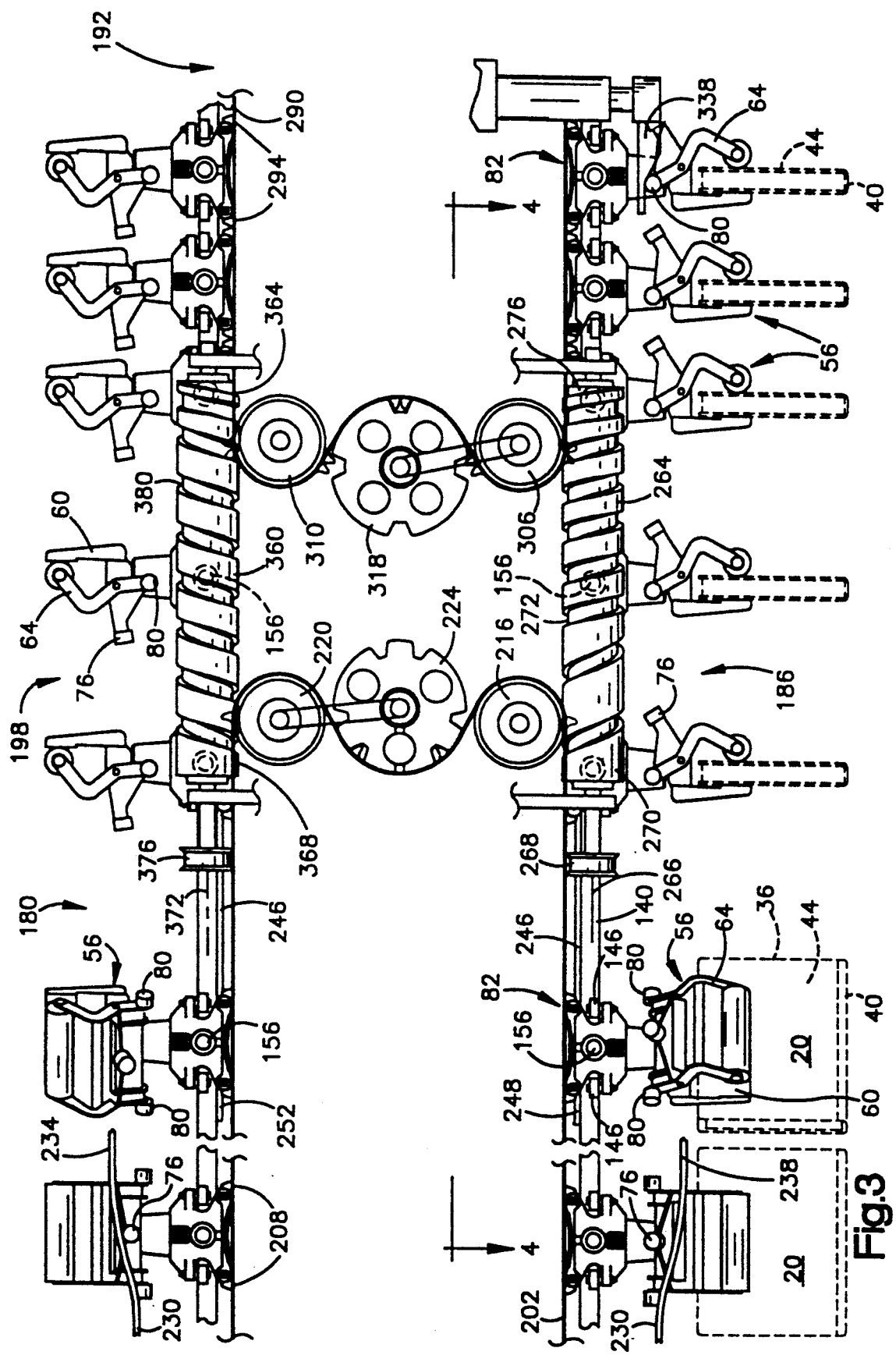

CUSTODIAL BOOK TRANSFER SYSTEM

BACKGROUND OF THE INVENTION

The present invention relates to an apparatus for transferring a plurality of sheet material articles.

Sheet material articles, such as assembled signature sets known as books, are often moved while in a vertical orientation and edge first through an automated binding machine to facilitate the binding process. Edge first movement permits the binding operation to be performed during continuous movement of the books. As the books are moved through the binding machine, the books are spaced at intervals to permit proper operation of the binding machine.

Subsequent to binding, the bound books require further processing, such as trimming, stacking or packaging. Often this further processing is accomplished when the books are in a horizontal orientation as they are moved. Thus, there are transfer systems for changing the orientation of the books after they leave the binding machine.

SUMMARY OF THE INVENTION

The present invention provides an apparatus for transferring a plurality of collective sheet material articles, such as books, from a binder conveyor to another conveyor. The articles are moved by the binder conveyor edge first and at a first dimensional spacing. The articles are moved by the other conveyor face first and at a second dimensional spacing, different from the first spacing.

The apparatus includes a plurality of grippers for receiving the articles from the binder conveyor and gripping the articles. The apparatus includes means for moving the grippers at a first interval and a first orientation to move the articles edge first and with the first spacing. The apparatus includes means for rotating the grippers from the first orientation to a second orientation to rotate the articles from an edge first orientation to a face first orientation.

The apparatus includes means for changing the relative spacing of the grippers from the first interval to a second interval, different from the first interval, to reposition the articles from the first spacing to the second spacing. The apparatus includes means for moving the grippers at the second interval and the second orientation to move the articles face first and with the second spacing. The grippers release the articles to the other conveyor.

BRIEF DESCRIPTION OF THE DRAWINGS

The foregoing and other features of the present invention will become apparent to one skilled in the art upon a consideration of the following description of the invention with reference to the accompanying drawings, wherein:

FIG. 2A is a plan view of the carriage and gripper taken along line 2A—2A in FIG. 2;

FIG. 3 is an enlarged view of a portion of the apparatus shown in FIG. 1;

DESCRIPTION OF PREFERRED EMBODIMENT

Figure 1:
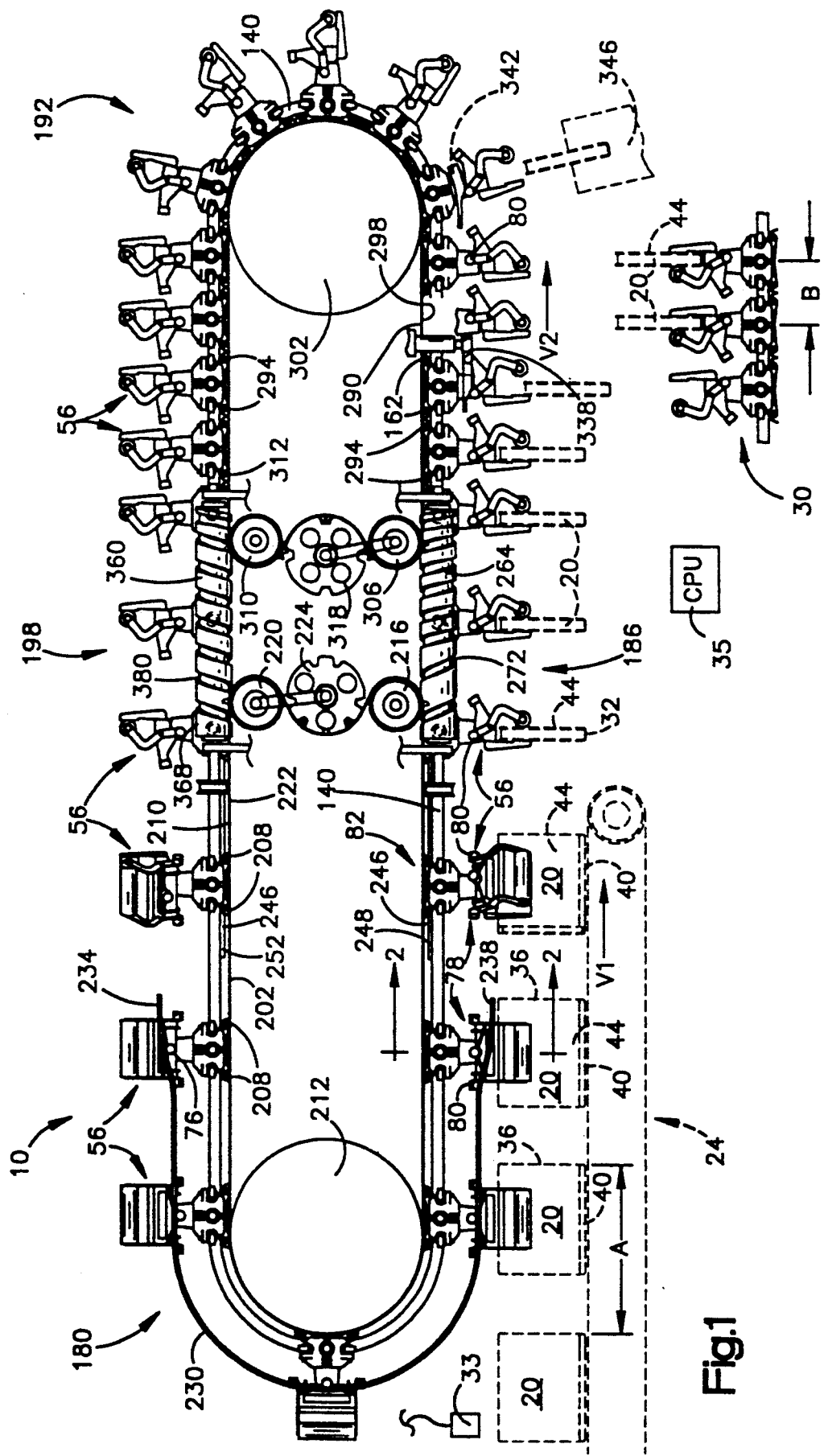
FIG. 1 is a schematic illustration of an apparatus for transferring a plurality of collective sheet material articles, embodying the present invention.

The present invention provides an apparatus 10 (FIG. 1) for transmitting a plurality of books 20 from a binder conveyor 24 to another conveyor 30. The books 20 are collective sheet material articles. The books 20 have a cover, or binding, 32 applied by a binder machine (not shown) to retain the sheets together. A sensor 33 is positioned adjacent to the conveyor 24 to sense the condition of each of the books 20. The condition which is sensed could include any quality control aspect, such as a misbind, a fold or a tear. The sensor 33 is only schematically illustrated and could be of varied design. The sensor 33 is connected to a CPU controller 35.

The binder conveyor 24 is schematically illustrated. The orientation of each of the books 20, as the books 20 are moved by the binder conveyer 24, is leading edge 36 first. Typically, the leading edge 36 is perpendicular to a bound edge 40.

The books 20 are spaced on the binder conveyor 24 at a spacing interval A, which is sufficient to have allowed a binding operation to have been performed. The spacing interval A is generally slightly longer than the length of each of the books 20. The books 20 are moved at a speed V1 by the binder conveyor 24. The speed V1 is a desired speed for effective and efficient operation of the binding process.

The other conveyor 30 is schematically illustrated. The orientation of the books 20, as the books 20 are moved by the other conveyor 30, is face 44 first. The books 20 are spaced on the other conveyor 30 at a spacing interval B. The interval B is sufficient to allow desired further processing of the books 20. Typically, the spacing B is slightly greater than the width of each of the books 20. The books 20 are moved at a speed V2 by the other conveyor 30. The speed V2 is a desired speed for effective and efficient further operation.

The apparatus 10 includes a plurality of grippers 56 for gripping and moving the books 20. Each of the grippers 56 includes a stationary jaw 60 (FIG. 2) and a movable jaw 64. The movable jaw 64 is pivotally connected to the stationary jaw 60 by a pivot pin 66.

The stationary jaw 60 has an engaging surface 68 at a lower end 70 for engaging one of the books 20. The movable jaw 64 has an engaging pad 72 at a lower end 73 for engaging one book 20 (shown in phantom). The movable jaw 64 is spring biased by a spring (not shown) toward the stationary jaw 60 to a closed position (shown in phantom in FIG. 2). Thus, the movable jaw 64 closes to grip and hold the one book 20.

The movable jaw 64 has a projection 74. A roller 76 is mounted on the projection 74. The movable jaw 64 is movable by a force F applied to the roller 76.

The movable jaw 64 has an upper portion 78 (FIG. 1). Rollers 80 are mounted on either side of the upper portion 78 of the movable jaw 64. The movable jaw 64 is movable when a force is applied to either or both of the rollers 80.

Each of the grippers 56 is mounted on a carriage 82 by a rotatable spindle 86 (FIG. 2) and a screw 92. The carriage 82 includes a carriage body 94. The carriage body 94 includes a base 96. The carriage body 94 includes a projection 97 extending downwardly from the base 96.

The spindle 86 extends through a bore 98 in the projection 97 of the carriage body 94. An annular bearing flange 99 is positioned in an upper end of the bore 98 and engages the surface of the body 94 which defines the bore 98. An upper portion 101 of the spindle 86 engages the bearing flange 99. An annular bearing flange 102 is positioned in a lower end of the bore 98 and engages a lower portion 103 of the spindle 86.

The gripper 56 is held against the lower portion 103 of the spindle 86 by the screw 92. The lower portion 103 spindle 86 has a downwardly projecting locating pin 104. The locating pin 104 extends parallel to the screw 92 and extends into a hole on the gripper 56, to rotate the gripper 56 upon rotation of the spindle 86. The spindle 86 is biased by a spring 106, positioned within the bore 98, toward a first rotational direction. Thus, each of the grippers 56 is biased in the first rotational direction.

Figure 2:
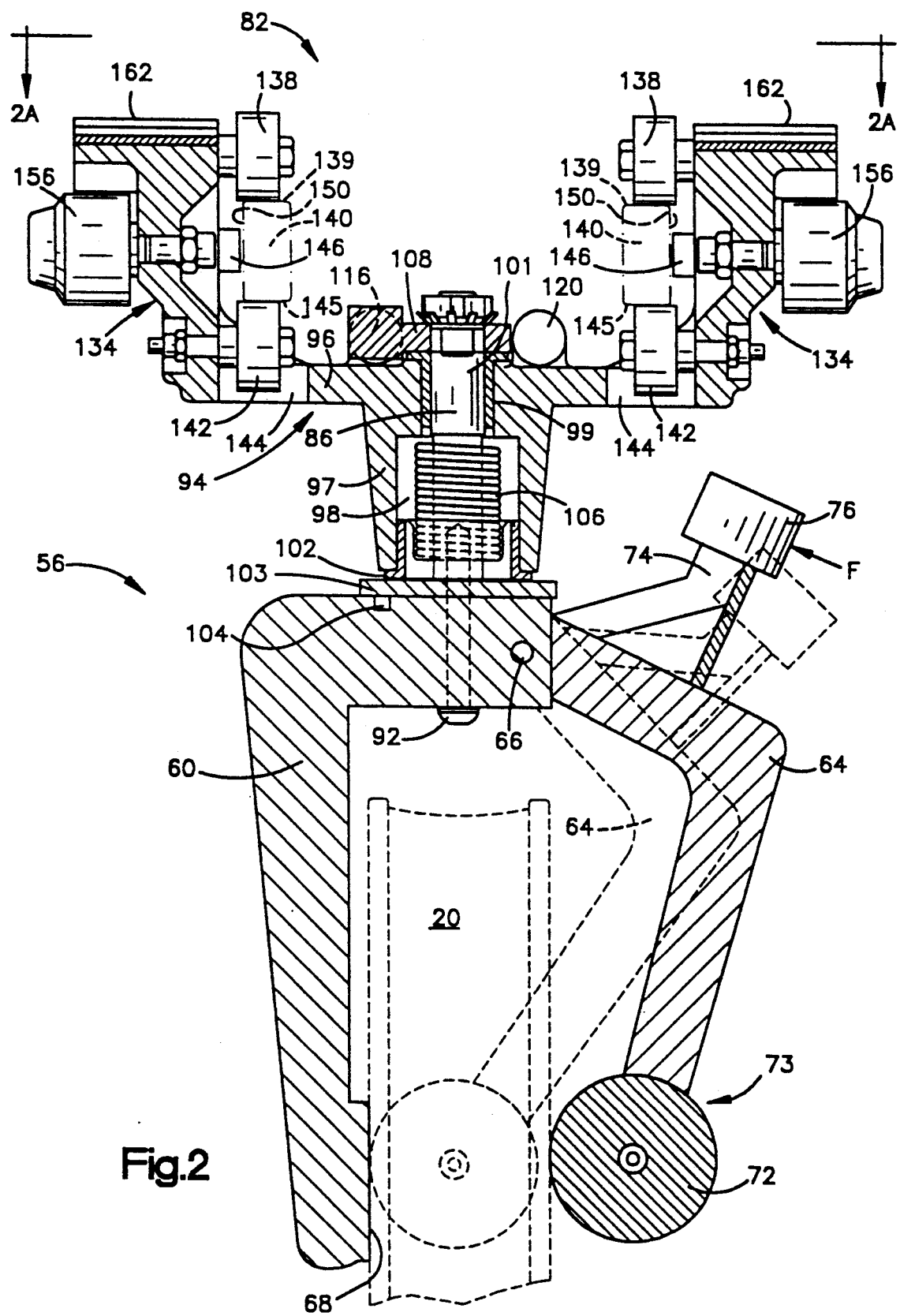
FIG. 2 is a sectional view taken along line 2—2 in FIG. 1 illustrating a carriage and gripper of the apparatus shown in FIG. 1.

An arm 108 is attached to, and extends from, the upper portion 101 of the spindle 86. A roller 124 (FIG. 2A) is mounted on top of the arm 108. The arm 108 is rotatable, about an arc, with the spindle 86. The arm 108 is engageable with a first stop 116 on the carriage body 96 and a second stop 120 on the carriage body 96. The arm 108 is biased against the first stop 116 via the spring 106 (FIG. 2). With the arm 108 against the first stop 116, the gripper 56 is in a first rotational position (as shown in FIG. 2).

The carriage body 94 includes two upwardly extending arms 134. The arms 134 are positioned on either side of the base 96. Two upper rollers 138 are mounted on the upper inside of each of the arms 134. One of the two upper rollers 138 on each of the arms 134 is mounted toward the front of the body 94 (FIG. 2A) and the other of the upper rollers 138 is mounted toward the rear of the body 94. The upper rollers 138 engage upper surfaces 139 of fixed track rails 140 (shown in phantom) of the apparatus 10.

A lower roller 142 (FIG. 2) is mounted on the lower inside of each of the arms 134 of the carriage 82. Each of the lower rollers 142 is mounted midway through the body 94. Each of the lower rollers 142 is partially positioned within an opening 144 in the base 96. The lower rollers 142 each engage a lower surface 145 of the fixed track rails 140. The upper and lower rollers 138 and 142 on each of the arms 134 rotate in vertical planes.

Two middle rollers 146 are midway up on each of the arms 134 between the upper and lower rollers 138 and 142. One of the two middle rollers 146 on each of the arms 134 is mounted toward the front of the body 94 (FIG. 2A) and the other of the middle rollers 138 is mounted toward the rear of the body 94. The middle rollers 146 are rotatable in a horizontal plane. The horizontal plane is perpendicular to the vertical planes in which the upper and lower rollers 138, 142 rotate. The middle rollers 146 engage outer surfaces 150 of the fixed track rails 140.

An outer roller 156 is mounted on the outside of each of the arms 134. The outer rollers 156 are each rotatable in vertical planes. The arms 134 have upper edges 162.

The plurality of grippers 56 (FIG. 1) extend around the fixed track rails 140. The fixed track rails 140 extend parallel to each other in an oval shape. The plurality of grippers 56 are moved in a stream around the fixed track rails 140 (in a counterclockwise direction as viewed in FIG. 1).

The apparatus 10 includes a first endless loop conveyor 180, a first barrel cam conveyor 186, a second endless loop conveyor 192 and a second barrel cam conveyor 198 positioned along the fixed track rails 140. The first endless loop conveyor 180 extends along a left portion, as viewed in FIG. 1, of the fixed track rails 140. The first endless loop conveyor 180 is positioned adjacent to a portion of the binder conveyor 24.

The first endless loop conveyor 180 includes a continuous belt or chain 202. The belt 202 extends partially along the fixed track rails 140. The belt 202 is positioned adjacent to the fixed track rails 140.

The belt 202 has a plurality of finger sets 208 which extend outwardly from the outer surface 210 of the belt 202. Each of the finger sets 208 engage the edges 162 (FIG. 2) of one of the carriages 82. The finger sets 208 are spaced along the belt 202 to move the carriages 82 at a first spacing.

A drive sprocket 212 is positioned within the fixed track rails 140, to rotate the belt 202 (counterclockwise as viewed in FIG. 1). The belt 202 extend around the drive sprocket 212. First and second idler wheels 216 and 220 are positioned to engage the inner surface 222 of the belt 202. The belt 202 extend around the first and second idler wheels 216 and 220. An idler sprocket 224 is engaged with the outer surface 210 of the belt 202 between the first and second idler wheels 216 and 220.

The belts 202 extend horizontally between the drive sprocket 212 and the first and second idler wheels 216 and 220. The plurality of finger sets 208 retain engagement with the edges 162 of the carriages 82 as the belt 202 extends around the drive sprocket 112 and as the belt 202 extends horizontally. However, the first and second idler wheels 216 and 220 have sufficiently small radii to cause the belt 202 to flex to open the finger sets 208 sufficiently far to release or receive one of the carriages 82.

A cam rail 230 is positioned outside of the fixed track rails 140 and adjacent to a portion of the belt 202 extending around the drive sprocket 212. The cam rail 230 is positioned to engage the roller 76 on each of the grippers 56 to provide the force F (FIG. 2) and hold the movable jaw 64 open as the grippers 56 ar moved by the first endless loop conveyor 180. The cam rail 230 tapers inwardly toward the fixed track rails 140 at its first end 234 to engage the roller 76 of each of the plurality of grippers 56 and gradually force the movable jaw 64 of the grippers 56 opened as the grippers 56 are moved by the first endless loop conveyor 180. The cam rail 230 tapers outwardly away from the fixed track rails 140 at its second end 238 to gradually permit the movable jaw 64 to close as the grippers 56 are moved by the first endless loop conveyor 180 adjacent the binder conveyor 24.

A camming rail 246 (FIG. 3) is positioned between the fixed track rails 140 to engage the roller 124 (FIG. 4) of each of the carriages 82. The camming rail 246 (FIG. 1) extends partially along the first endless loop conveyor 180, downstream of the cam rail 230. The camming rail 246 extends along the first barrel cam conveyor 186, the second endless loop conveyor 192 and the second barrel cam conveyor 198. The camming rail 246 extends partially along the first endless loop conveyor 180, upstream of the cam rail 230.

Figure 4:
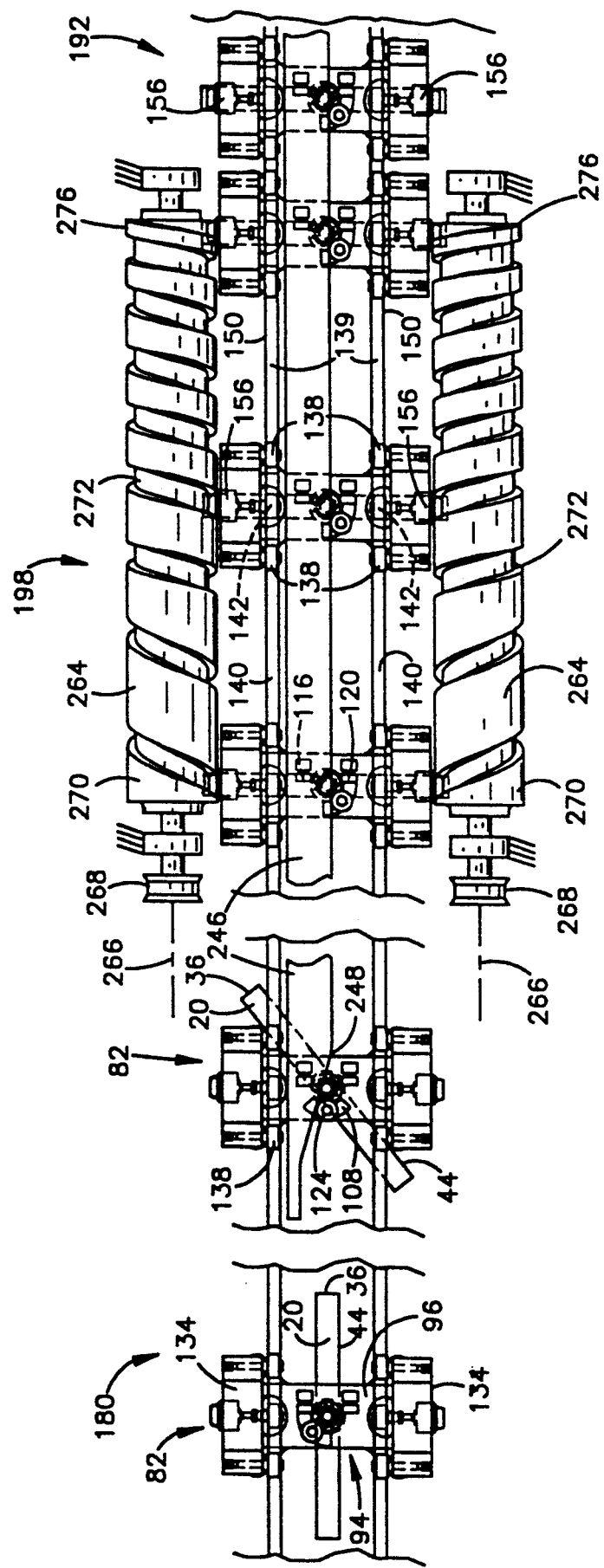
FIG. 4 is a sectional view taken along line 4—4 in FIG. 3.

The camming rail 246 has a first tapered end 248 (FIGS. 1, 3 and 4). The first tapered end 248 is positioned slightly downstream of the second end 238 of the cam rail 230 to engage and pivot the roller 124 (FIG. 4) about the axis of the spindle 86. The camming rail 246 (FIGS. 1 and 3) has a second tapered end 252. The second tapered end 252 is similar to the first tapered end 248. The second tapered end 252 is positioned slightly upstream of the first end 234 of the cam rail 230 and permits the roller 124 of the carriage 82 to pivot.

The first barrel cam conveyor 186 is positioned slightly downstream of the first tapered end 248 of the camming rail 246 and positioned below the first idler wheel 216 of the first endless loop conveyor 180. The first barrel cam conveyor 186 includes two rotating barrels 264 (FIG. 4) positioned parallel to each other along the outside of the fixed track rails 140. The barrels 264 are synchronously driven about their axes 266 by a drive belt (not shown) which engages a pulley 268 attached to a first end 270 of each of the barrels 264. The barrels 264 are rotated such that the portions adjacent the fixed track rails 140 are rotated downward into the plane of FIG. 4.

Each of the barrels 264 has a spiral cam groove 272 extending along its length for engaging the outer rollers 156 of the carriages 82. The spiral cam grooves 272 are mirror images of each other and each has a helical pitch spacing which varies over the length of the barrels 264. The helical pitch spacing of the spiral cam grooves 272 decreases as the spiral cam grooves 272 extend from the first ends 270 to second ends 276 of the barrels 264.

The second endless loop conveyor 192 extends along a righthand portion (as viewed in FIG. 1) of the fixed track rails 140. The second endless loop conveyor 192 is positioned downstream of the first barrel cam conveyor 186 and positioned adjacent to the other conveyor 30. The second endless loop conveyor 192 includes a continuous belt or chain 290. The belt 290 is positioned adjacent to the fixed track rails 140. The belt 290 has a plurality of finger sets 294 which extend outwardly from an outer surface 298 of the belt 290. Each of the finger sets 294 engages the edges 162 of one of the carriages 82.

A drive sprocket 302 is positioned within the fixed track rails 140 to rotate the belt 290 (counterclockwise as viewed in FIG. 1). The belt 290 extends around the drive sprocket 302. First and second idler wheels 306 and 310 are positioned to engage an inner surface 312 of the belt 290. The belt 290 extends around the first and second idler wheels 306 and 310. An idler sprocket 318 is engaged with the outer surface 298 of the belt 290 between the first and second idler wheels 306 and 310.

The finger sets 294 are spaced along the belt 290 at a spacing which is closer than the spacing of the finger sets 208 on the belt 202. The finger sets 294 grip the upper edge 162 of the carriages 82 as the belt 290 extends around the drive sprocket 302 and horizontally toward the first and second idler wheels 306 and 310. The first and second idler wheels 306, 310 have radii sufficiently small to cause the belt 290 to flex sufficiently to spread the finger sets 290 to release or receive one of the carriages 82.

A movable arm 338 is positioned adjacent to the second endless loop conveyor 192. The arm 338 is movable to engage one or both of the rollers 80 of the movable jaw 64 to force the movable jaw 64 to open when the grippers 56 are above the other conveyor 30. The movable arm 338 is connected to the controller 35. The controller 35 activates the arm 338 to move responsive to the information provided by the sensor 33. Thus, movement of the arm 338 can be selective.

A fixed arm 342 is positioned downstream of the movable arm 338. The fixed arm 342 engages one or both of the rollers 80 on each of the grippers 56 to open the grippers 56 and release any retained books 20 to a collection 346. The collection 346 can be either for discard, correction, or another conveyor similar to 30.

The second barrel cam conveyor 198 is positioned downstream of the second endless loop conveyor 192. The second barrel cam conveyor 198 is positioned above the second idler wheel 310 of the second endless loop conveyor 192 and above the second idler wheel 220 of the first endless loop conveyor 180. The second barrel cam conveyor 198 is similar to the first barrel cam conveyor 186. The second barrel cam conveyor 198 includes two rotating barrels 360 (only one is shown) positioned parallel to each other along the outside of the fixed track rails 140. The barrels 360 each have first and second ends 364 and 368 (FIG. 3). The barrels 360 are synchronously driven about their axes 372 by a drive belt (not shown) which engages pulleys 376 attached to the second ends 368 of each of the barrels 360. The barrels 360 are rotated similar to the rotation of the barrels 264 of the first barrel cam conveyor 186.

Each of the barrels 360 has a spiral cam groove 380 extending along the length for engaging the outer rollers 156 of the carriage 182. The spiral cam grooves 380 are mirror images of each other and each has a helical pitch spacing which varies over the length of the barrel 360. The helical pitch spacing of the spiral cam grooves 380 increases as the spiral cam groove 380 extends from the first end 364 to a second end 368 of the barrels 360.

In operation, the books 20 (FIG. 1) are moved along the binder conveyor 24 with the first velocity V1 and with the spacing A. A each book 20 is moved, the book 20 is moved past the sensor 33. The sensor 33 senses the condition of the book 20. The sensor provides the sensed information to the controller 35. The grippers 56 are moved by the first endless loop conveyor 180 at a velocity which is substantially equal to the velocity V1. As the grippers 56 are rotated around the circumference of the drive sprocket 212, the roller 76 on the movable jaw 64 is engaged with the cam rail 230. Thus, the movable jaw 64 is held open. As the grippers 56 ar rotated about the drive sprocket 212 toward the binder conveyor 24, the stationary arm 60 and the movable arm 64 are moved down on either side of one of the books 20.

The books 20 and the plurality of grippers 56, which are being held open, are moved horizontally substantially at the same speed. As the grippers 56 moves down the second end 238 of the cam rail 230, the roller 76 is permitted to move outwardly. Thus, the movable jaw 64 is permitted to pivot toward the stationary arm 60. One of the books 20 is thereby captured between the movable jaw 64 and the stationary arm 60. At this point, the gripper 56 attains control of the book 20. The first endless loop conveyor 180 continues to move the gripper 56, and thereby moves the book 20.

As each gripper 56 is moved downstream from the second end 238 of the cam rail 230, the gripper 56 is moved adjacent to the first tapered end 248 of the camming rail 246. As the gripper 56 is moved downstream, the roller 124 (FIG. 4) engages the first tapered end 248 of the camming rail 246. The camming rail 246 pushes against the roller 124.

Figure 5:
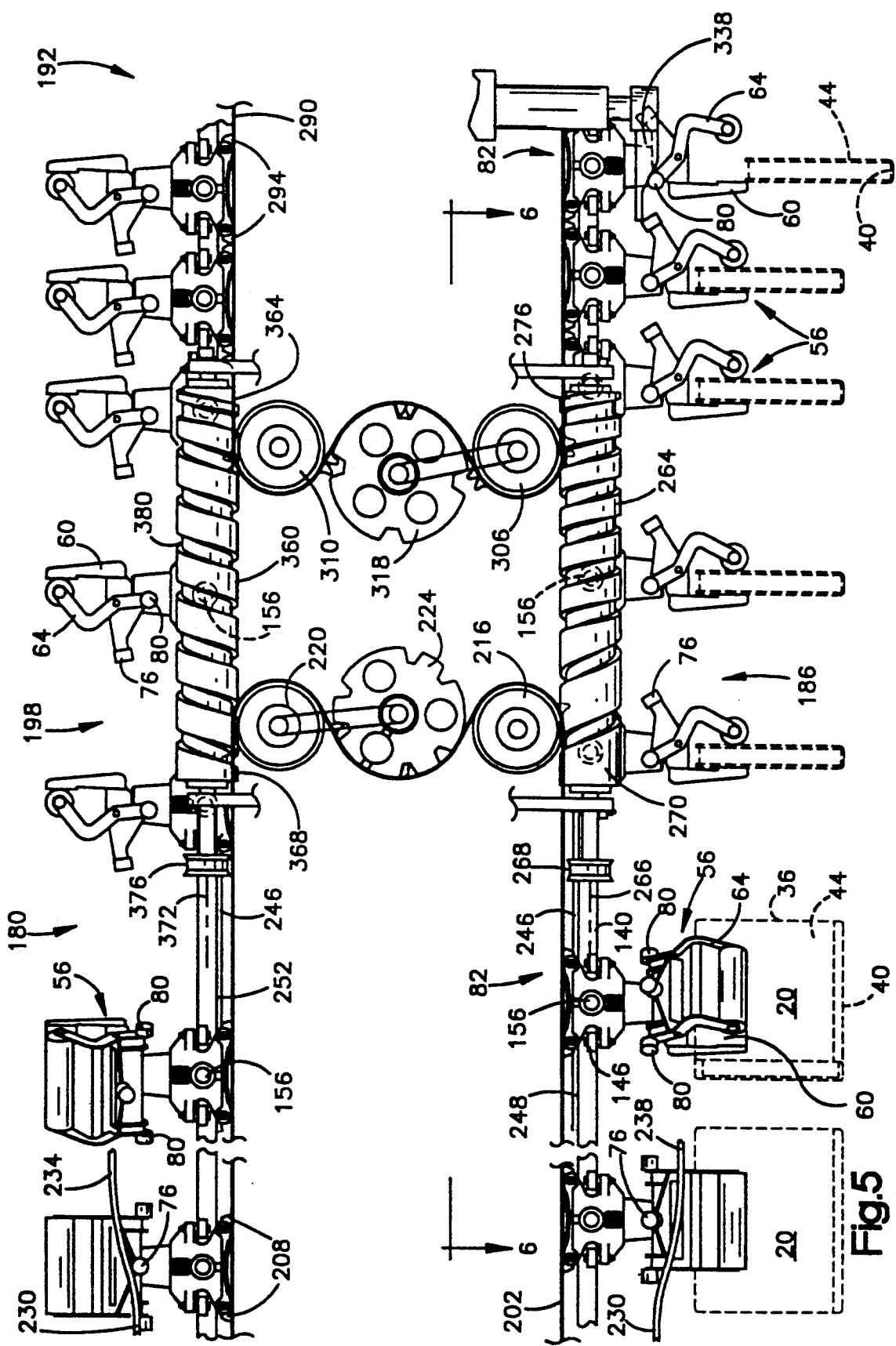
FIG. 5 is an enlarged view of a portion of the apparatus shown in FIG. 1 at a subsequent time.
Figure 6:
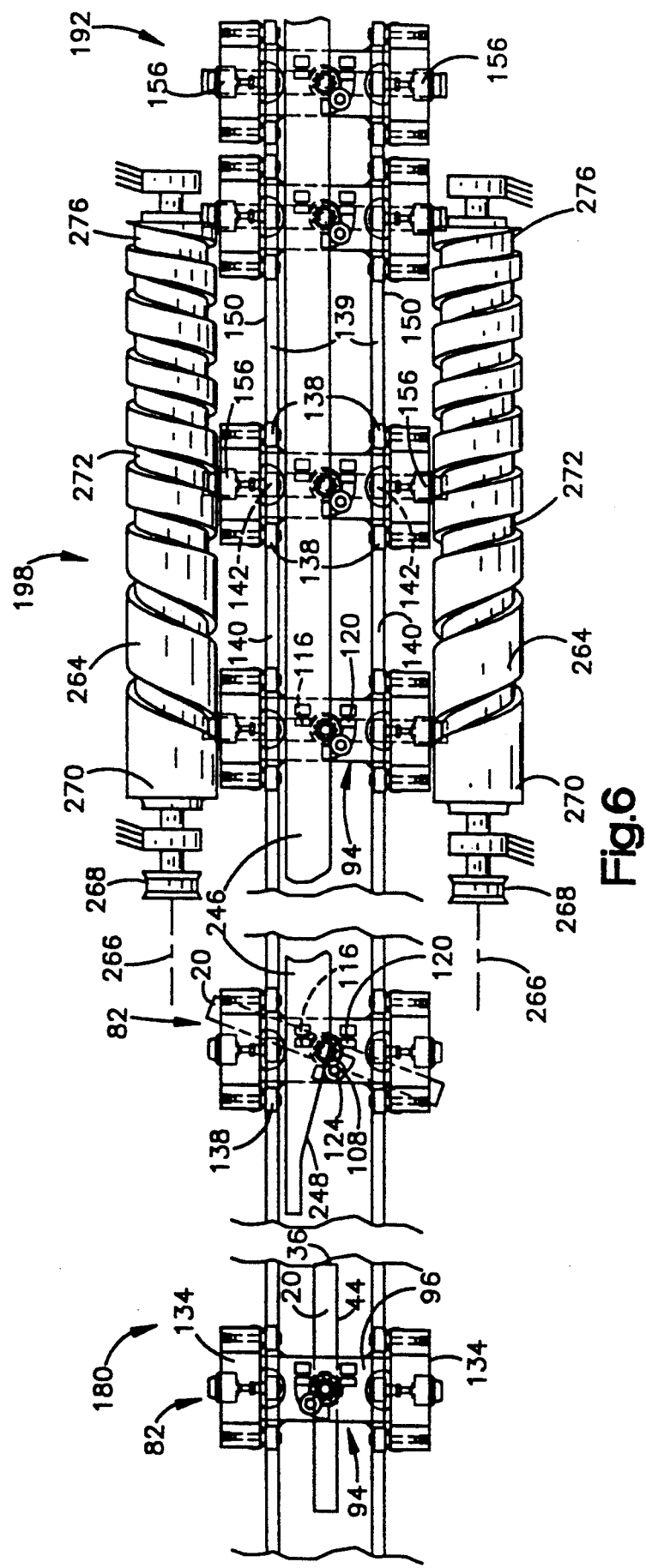
FIG. 6 is a sectional view taken along line 6—6 in FIG. 5.

The roller 124 is rotated and is also displaced (in a downward direction as viewed in FIG. 4). The displacement of the roller 124 rotates the arm 108 (FIG. 2) and the spindle 86. The spindle 86 is rotated against the bias of the spring 106. The gripper 56 and the book 20 are rotated (counterclockwise, as shown in FIG. 4, or clockwise). Continued movement of the gripper 56 and the book 20 downstream causes further rotation of the gripper 56 and the book 20 (FIGS. 5 and 6).

As the gripper 56 moves along the extent of the first tapered end 248 of the camming rail 246, the arm 108 is moved from engagement with the first stop 116 to engage the second stop 120 of the body 94 of the carriage 82. Thus, the book 20 is rotated 90° from leading edge 36 first to face 44 first orientation. The camming rail 246 remains engaged with the roller 124 to maintain the face 44 first orientation of the book 20 during further movement of the book 20 by the apparatus 10.

Each gripper 56 (FIG. 1) is further moved by the first endless loop conveyor 180 toward the first barrel cam conveyor 186. As the carriage 82 for each gripper 56 is moved under the first idler wheel 216 (FIGS. 3 and 5), the flexing of the belt 202 around the first idler wheel 216 causes the finger set 208 to release the carriage 82. The cam grooves 272 on the barrels 264 are synchronized to receive the outer rollers 156 of the carriage 82 when the carriage 82 is released from the finger set 208.

As the barrels 264 rotate, the cam grooves 272 move the carriage 82 and thus the gripper 56 and the book 20 downstream. As the barrels 264 continue to rotate (FIGS. 5 and 6), the varying pitch spacing of the cam grooves 272 move the carriage 82 further downstream. Also, the cam grooves 272 move the carriages 82 closer together as the carriages 82 approach the second end 276 of the barrels 264.

The carriages 82 are moved by the cam groove 272 under the first idler wheel 306 of the second endless loop conveyor 192. The belt 290 is flexed horizontal as it extends from the first idler wheel 306 toward the drive sprocket 302. As the belt 290 is flexed horizontal, one of the finger set 294 close onto, and retain, the edges 162 of each carriage 82 (FIGS. 3 and 5).

The closing of the finger set 294 onto the carriage 82 is coincident with the carriage 82 arriving at the second ends 276 of the barrels 264. Thus, the outer rollers 156 are released from the cam grooves 272 as the carriage 82 is retained by the finger set 294. The carriage 82, the gripper 56 and the book 20 are moved further downstream by the second endless conveyor loop 192.

The controller 35 (FIG. 1) operates the movable arm 338 to engage the arm 338 against at least one of the rollers 80, or not, as the carriage 56 is moved. If the arm 338 is moved by the controller 35 to engage the roller 80 of the gripper 56 (FIG. 5), the movable jaw 64 is pivoted away from the stationary arm 60 as the gripper 56 is moved downstream by the second endless loop conveyor 192. Thus, the book 20 is released from the gripper 56 to be received by the other conveyor 30. The other conveyor 30 will transport the book 20 to another location for further processing.

However, if the information sensed by the sensor 33 (FIG. 1) indicates that the book 20 is unsuitable for further processing along the other conveyor 30, the controller 35 does not move the arm 338 to engage the roller 80 of the gripper 56. The gripper 56 is moved further downstream by the second endless loop conveyor 192. The gripper 56 is moved adjacent to the fixed arm 342.

The fixed arm 342 engages the roller 80 on each of the grippers 56. Thus, the fixed arm 342 forces the movable jaw 64 open on each of the grippers 56. Any of the books 20 which have been retained by one of the grippers 56 due to the arm 338 not engaging the roller 80 is, thus, released to the collection 346. Therefore, all of the books 20 are removed from the grippers 56.

The second endless loop conveyor 192 moves the grippers 56 further downstream toward the second barrel cam conveyor 198 (FIGS. 3 and 5). As each carriage 82 is moved toward the first ends 364 of the barrels 360, the belt 290 is flexed around the exterior of the second idler wheel 310. The flexing of the belt 290 spreads the finger set 294 to release the edges 162 of the carriage 82. The cam grooves 380 of the barrels 360 are synchronized to receive the outer rollers 156 as the finger set 294 releases the carriage 82.

The rotation of the barrels 360 moves the carriages 82 and the grippers 56 downstream. As the cam grooves 380 move the carriages 82, the varying pitch spacing of the cam grooves 380 accelerates the carriages 82 and increases the spacing between the carriages 82.

As each carriage 82 approaches the second ends 368 of the barrels 360, the second idler wheel 220 causes the belt 202 to flex. As the belt 202 is flexed, each finger set 208 closes around the edges 162 of the carriage 82. The closing of the finger set 208 around the carriage 82 is synchronous with the cam grooves 380 releasing the outer rollers 156. The first endless loop conveyor 180 moves the carriage 82 and the gripper 56 downstream.

As the carriages 82 are moved they approach the second tapered end 252 of the camming rail 246. As each carriage 82 is moved past the second tapered end 252, the second tapered end 252 tapers away from the roller 124. Thus, the roller 124 and the arm 108 and the spindle 86 on the carriage 82 are permitted to rotate.

The rotation of the arm 108 and the spindle 86 is due to the bias of the spring 106. The rotation of the spindle 86 rotates the gripper 56, similar, but in an opposite direction, to the rotation of the gripper 56 by the first tapered end 248 of the camming rail 246. Continued movement of the grippers 56 by the first endless loop conveyor 180 (FIG. 5) cause continued rotation of the grippers 56 under the bias of the spring 106, until the grippers 56 are rotated 90° and the arm 108 engages the first stop 116.

As the first endless loop conveyor 180 moves each gripper 56 further downstream, the roller 76 engages the first end 234 (FIG. 1) of the cam rail 230. The cam rail 230 forces the movable jaw 64 open. The cam rail 230 retains the movable jaw 64 open as the first endless loop conveyor 180 moves the gripper 56 toward the binder conveyor 24 to receive a subsequent one of the books 20.

Figure 7:
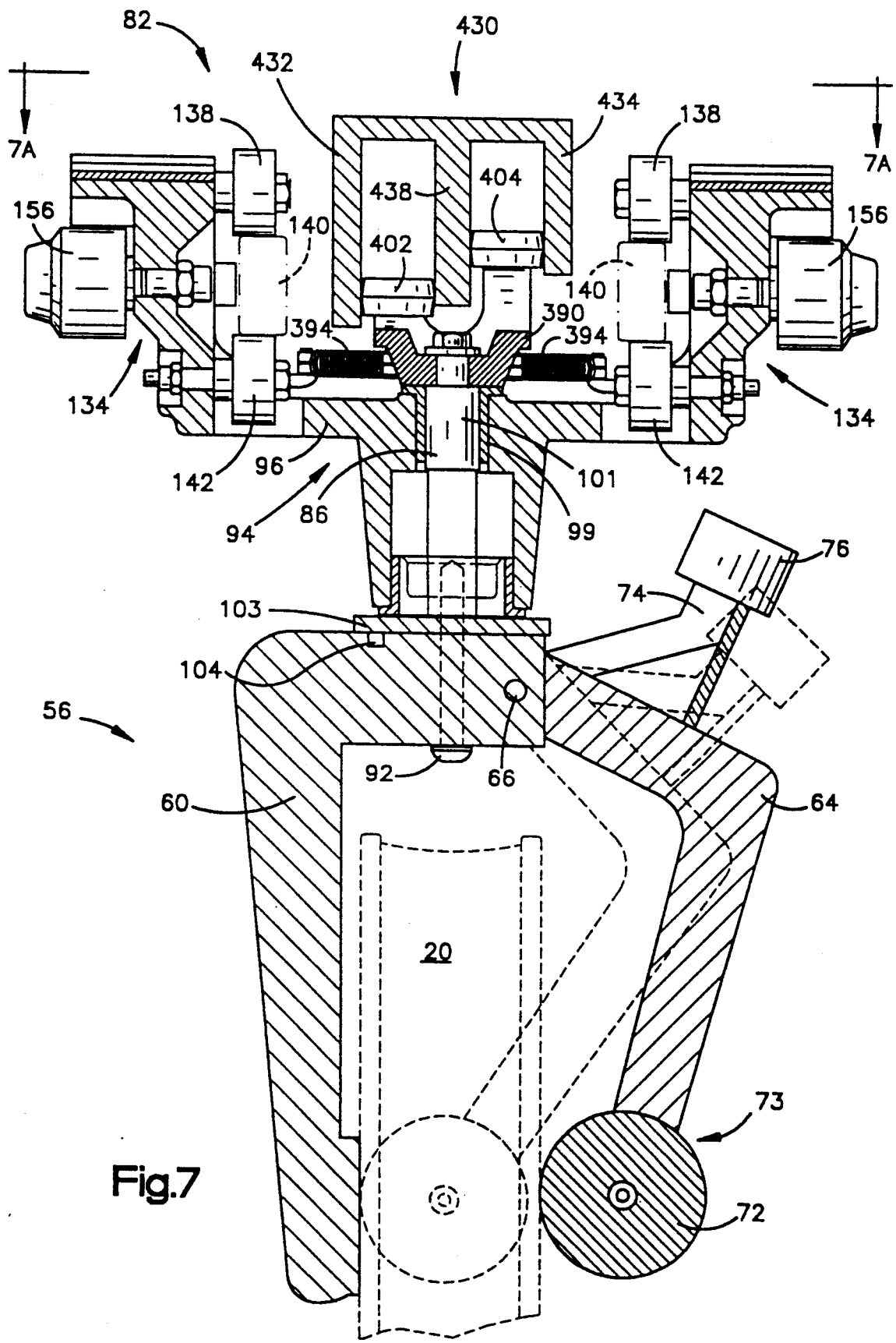
FIG. 7 is a sectional view illustrating a carriage of a second embodiment of the apparatus.
Figure 7A:
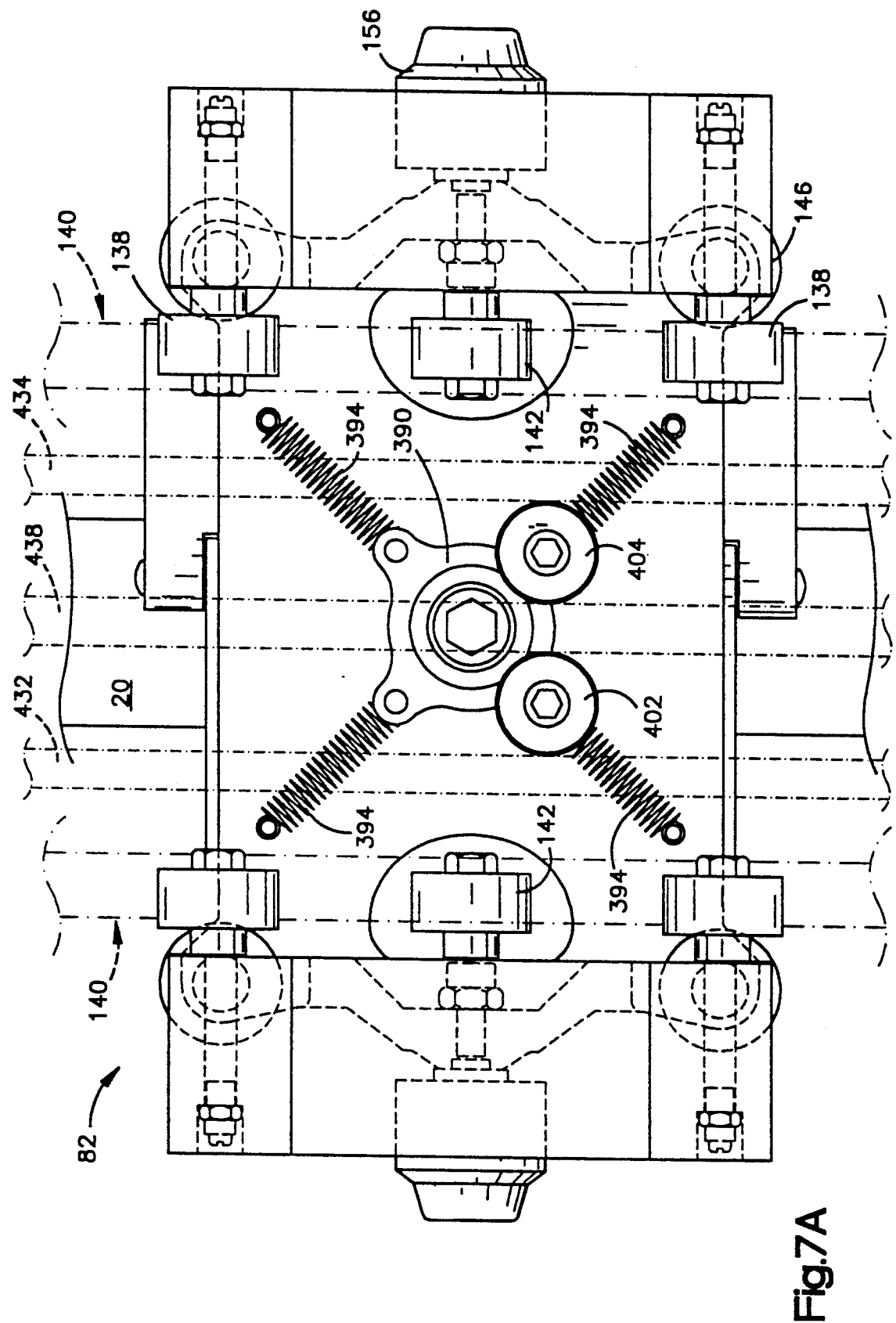
FIG. 7A is a plan view of the carriage of the second embodiment taken along line 7A—7A in FIG. 7.
Figure 8:
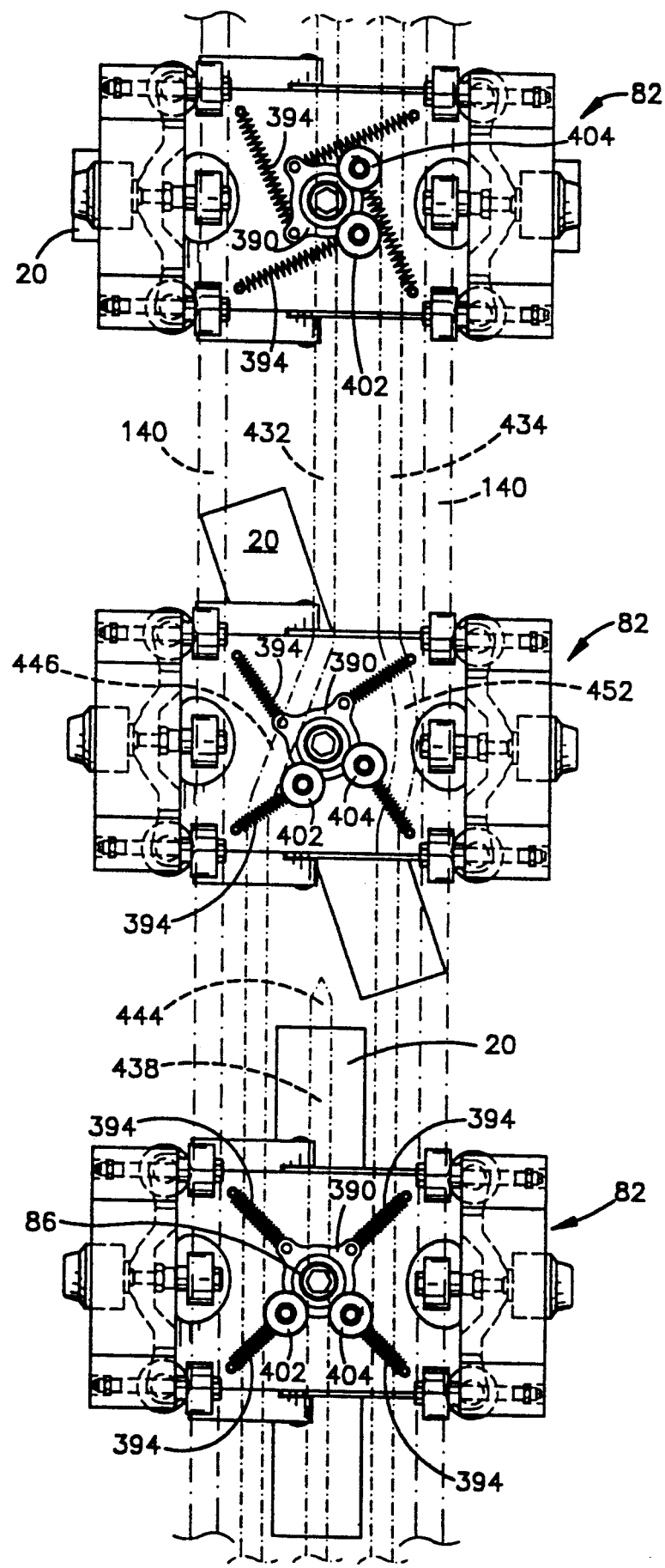
FIG. 8 is a portion of the second embodiment of the apparatus.

In another embodiment of the invention (FIGS. 7, 7A and 8, which is substantially similar to the first embodiment and wherein structure identical to that of the first embodiment is identified by the same reference numeral), the spindle 86 is rotatable in either direction from a neutral position. A flange 390 is attached to, and extends from, the upper portion 101 of the spindle 86. The flange 390 engages the bearing flange 99 and is rotatable with the spindle 86. Four springs 394 are attached at their first ends to the flange 390 and attached at their second ends to the base 96 of the carriage body 94. The springs 394 bias the spindle 86, and thus the gripper 56, toward the central neutral position. First and second rollers 402 and 404 are mounted on top of the flange 390. The rollers 402, 404 are mounted to rotate about axes which are parallel to the axis of the spindle 86. The rotational axes of the rollers 402, 404 (FIG. 7A are slightly rearward and slightly to the left and right, respectively, of the axis of the spindle 86.

A box cam 430 is positioned between the fixed track rails 140 to engage the first and second rollers 402 and 404. The box cam 430 includes first and second outer rails 432, 434 and a middle rail 438. The first and second outer rails 432, 434 extend along the first endless loop conveyor 180, the first barrel cam conveyor 186, the second endless loop conveyor 192 and the second barrel cam conveyor 198. The middle rail 438 extends partially along the first endless loop conveyor 180.

The middle rail 438 has an end 444 located near the second end 238 of the cam rail 230. The first outer rail 432 has an inwardly tapering section 446. The tapering section 446 is positioned slightly downstream of the second end 238 of the cam rail 230 and the end 444 of the middle rail 438 to ca and pivot the roller 402 about the axis of the spindle 86. The second outer rail 434 has an outward bow 452 located adjacent the tapering section 446 of the first outer rail 432. The middle rail 438 has an end (not shown) located near the first end 234 of the cam rail 230. The first outer rail 432 has an outward tapering section (not shown) positioned slightly upstream of the first end 234 of the cam rail 230 and which permits the roller 402 to cam and pivot. The second outer rail 434 has an outward bow (not shown) located adjacent the outward tapering section of the first outer rail 432.

In operation, as the grippers 56 are moved along the portion of the first endless loop conveyor 180 adjacent to the cam rail 230, the box cam 430 retains the first and second rollers 402, 404 and the spindle 86 in the neutral position. Subsequent to the gripper 56 attaining control of the book 20, the first roller 402 engages the tapering section 446. The tapering section 446 pivots the first roller 402 about the axis of the spindle 86. The second roller 404 is guided and permitted to pivot about the axis of the spindle 86 by the outward bow 452 of the second outer rail 432. The flange 390, and the spindle 86, are rotated against the bias of the springs 394. The gripper 56 and the book 20 are rotated (similar to the first embodiment). The outward tapering section of the first outer rail 432, and the adjacent outward bow of the second outer rail 434 operate in a corollary manner to permit reverse rotation of the gripper 56 back to the neutral position.

The box cam 430 can be reversed such that the taperings and bows are reversed between the first and second outer rails 432, 434. Thus, each gripper 56 and each book 20 would be rotated in an opposite direction to permit front face first or back face first movement of the books 20.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for transferring a plurality of sheet material articles from a binder conveyor to another conveyor, the articles being moved by the binder conveyor edge first and at a first dimensional spacing, the articles being moved by the another conveyor face first and at a second dimensional spacing, different from the first spacing, said apparatus comprising:

a plurality of grippers for receiving the articles from the binder conveyor and gripping the articles;

means for moving said grippers at a first interval and a first orientation to move the articles edge first and with the first spacing;

means for rotating said grippers from the first orientation to a second orientation to rotate the articles from edge first to face first;

means for changing the relative displacement of said grippers from the first interval to a second interval, different from the first interval, to reposition the articles from the first spacing to the second spacing;

means for moving said grippers at the second interval and the second orientation to move the articles face first and with the second spacing; and means for releasing said grippers to release the articles to the another conveyor.

2. An apparatus as set forth in claim 1, wherein said means for moving said grippers at a first interval and a first orientation includes a first endless loop drive means, said means for changing the relative displacement of said grippers from the first interval to a second interval includes rotatable barrel cam means, said means for moving said grippers at the second interval and the second orientation includes a second endless loop drive means.

3. An apparatus as set forth in claim 2, including a plurality of carriages, said grippers being pivotally mounted on said carriages, said first endless loop drive means including means for engaging said carriages and moving said carriages toward said barrel cam means, said barrel cam means including a varied pitch screw drive for engaging said carriages and moving said carriages toward said second endless loop drive means, said second endless loop drive means including means for engaging said carriages and moving said carriages.

4. An apparatus as set forth in claim 3, wherein said means for rotating said grippers includes cam means, each of said carriages having a portion for engagement with said cam means, said grippers being rotated upon engagement of said portion with said cam means.

5. An apparatus as set forth in claim 4, wherein said grippers having central neutral positions and being rotatable in either direction from the central neutral positions, said cam means including a first rail means for controlling the rotational orientation of said grippers and having a tapering portion changing the rotational orientation of said grippers.

6. An apparatus as set forth in claim 5, wherein said portion of said carriage for engagement with said cam means including wheel means for engaging said tapering portion on said first rail means, said cam means including a second rail means for controlling the rotational orientation of said grippers.

7. An apparatus as set forth in claim 6, wherein said second rail means having a bowed segment for permitting and guiding rotation of said grippers 8. An apparatus as set forth in claim 1, including a plurality of carriages, said grippers being pivotally mounted on said carriages.

9. An apparatus as set forth in claim 8, wherein said means for rotating said grippers includes a camming rail for engaging an arm means to rotate said grippers relative to said carriages.

10. An apparatus as set forth in claim 8, wherein each of said grippers includes relatively movable jaws, said grippers including bias means for biasing said jaws closed.

11. An apparatus as set forth in claim 10, including means for maintaining said jaws open to receive said articles during movement of said grippers by said means for moving said grippers at a first interval and a first orientation, and means for permitting said bias means to close said jaws onto the articles.

12. An apparatus as set forth in claim 11, said means for maintaining said jaws open including a rail positioned adjacent to said means for moving said grippers at a first interval and a first orientation, each of said grippers having a portion for engaging said rail, said jaws being held open during engagement of said portion with said rail.

13. An apparatus as set forth in claim 10, including means for selectively opening said jaws to release said articles to the another conveyor during movement of said gripper by said means for moving said grippers at said second interval and the second orientation.

14. An apparatus as set forth in claim 8, wherein said carriages are sequentially engaged with said means for moving said grippers at a first interval and a first orientation, said means for changing the relative displacement of said grippers, and said means for moving said grippers at the second interval and the second orientation.

15. An apparatus as set forth in claim 1, including means for changing the relative displacement of said grippers from the second interval to the first interval subsequent to said grippers releasing the articles and means for rotating said grippers from the second orientation to the first orientation subsequent to said grippers releasing the articles.

16. An apparatus as set forth in claim 15, wherein said means for changing the relative displacement of said grippers from the second interval to the first interval includes a rotatable barrel cam means, said means for rotating said grippers from the second orientation to the first orientation includes a camming rail for engaging said grippers.

17. Apparatus for transferring a plurality of sheet material articles from a first conveyor to a second conveyor, the articles being moved by the first conveyor edge first and at a first dimensional spacing, the articles being moved by the second conveyor face first and at a second dimensional spacing, different from the first spacing, said apparatus comprising:

means for gripping the articles as the articles are moved by the first conveyor;

means for moving said means for gripping to move the articles edge first and with the first spacing away from the first conveyor;

means for rotating said means for gripping to rotate the articles from edge first to face first;

means for changing a spacing interval of said means for gripping to reposition the articles from the first spacing to the second spacing; and means for releasing the articles from the means for gripping to the second conveyor.

18. An apparatus as set forth in claim 17, wherein said means for gripping includes a plurality of grippers, said grippers being moved by said means for moving at a first interval and a first orientation, said grippers being rotated by said mean for rotating from the first orientation to the second orientation.

19. An apparatus as set forth in claim 18, including means for moving said grippers at a second interval and a second orientation to move the articles face first and with the second spacing.

20. An apparatus as set forth in claim 17, wherein said means for moving includes endless loop drive conveyor means, said means for rotating includes stationary cam rail means, said means for changing a spacing interval includes rotating barrel cam means.

* * * * *